(12) United States Patent
Kang et al.

(10) Patent No.: US 7,583,411 B2
(45) Date of Patent: Sep. 1, 2009

(54) GAMUT MAPPING APPARATUS AND METHOD THEREOF

(75) Inventors: Byoung-ho Kang, Yongin-si (KR); Dae-won Kim, Daegu (KR); Heui-keun Choh, Seongnam-si (KR); Min-ki Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 11/305,244

(22) Filed: Dec. 19, 2005

(65) Prior Publication Data

US 2006/0170940 A1    Aug. 3, 2006

(30) Foreign Application Priority Data

Jan. 28, 2005    (KR) .................. 10-2005-0008164

(51) Int. Cl.
*H04N 1/40* (2006.01)
(52) U.S. Cl. .................. 358/2.1; 358/504; 382/166
(58) Field of Classification Search .................. 358/1.9, 358/2.1, 518–523, 527, 500, 504, 530; 382/162–167
See application file for complete search history.

(56) References Cited

U.S. PATENT DOCUMENTS

| 6,205,246 B1 * | 3/2001 | Usami ................. 382/167 |
| 6,724,507 B1 * | 4/2004 | Ikegami et al. .......... 358/518 |
| 7,177,465 B1 * | 2/2007 | Takahira ............... 382/166 |
| 2005/0276474 A1 * | 12/2005 | Um et al. ............... 382/167 |

* cited by examiner

*Primary Examiner*—Thomas D Lee
*Assistant Examiner*—Stephen M Brinich
(74) *Attorney, Agent, or Firm*—Sughrue Mion, PLLC

(57) ABSTRACT

Apparatuses and methods for performing gamut compression. A gamut mapping apparatus of the invention includes a gamut analyzing unit for analyzing the gamut of a source device and the gamut of a target device using a gamut information profile; a gamut compressing unit for mapping original images of the source device within the gamut of the target device by using the analytical information on the gamuts; and a gamut extending unit for increasing the chroma of predetermined images among the compressed original images on the basis of the analytical information on the gamuts and the performance result of the gamut compressing unit.

22 Claims, 7 Drawing Sheets

| COLOR AREA | START C* POINT |
|---|---|
| R | 50.0 |
| Y | 40.0 |
| G | 40.0 |
| C | 20.0 |
| B | 15.0 |
| M | 35.0 | ically to a color gamut of an imaging source device, and the configuration of the color gamut of a target device.
GAMUT MAPPING APPARATUS AND METHOD THEREOF

CROSS-REFERENCE TO RELATED APPLICATIONS

This application claims priority from Korean Patent Application No. 2005-08164, filed Jan. 28, 2005, in the Korean Intellectual Property Office, the entire content of which is incorporated herein by reference.

BACKGROUND OF THE INVENTION

1. Field of the Invention

Apparatuses and methods consistent with the present invention relate to gamut mapping, and more specifically to performing a gamut compression and extension adaptively to a color gamut of an imaging source device, and the configuration of the color gamut of a target device.

2. Description of the Related Art

Gamut compression is the process of mapping colors that do not exist within the color gamut of a target device among original images of a source device, i.e., the target color gamut, into the color gamut of the target device, especially in a case where the color gamut of the target device is larger than the color gamut of the source device during the color reproduction process between apparatuses.

In general, color input/output devices for reproducing colors, e.g., monitors, scanners, cameras, printers, etc., use different color spaces or color models by application fields. In case of a color image, for example, a printing device uses the CMY color space, color Cathode Ray Tube (CRT) motors or computer graphic devices use the RGB color space, and devices dealing with hue, chroma and brightness use the HSI color space. Also, there is the CIE color space for defining device-independent colors that can be accurately reproduced in any device. Typical examples of the CIE color space include a CIE-XYZ, CIE-Lab, and CIE-Luv.

Besides the color space, color input/output devices have different ranges of color (i.e., a color gamut) that can actually exist within any color model for the devices. The difference in the color gamut explains why the same image looks different in every input/output device. Therefore, if differences in color gamuts between an input color signal and a device for reproducing the input color signal are great, the input color signal should be adequately converted to match the different color gamuts and enhance color reproducibility (this process is called gamut mapping).

Usually, for gamut mapping between different color input/output devices, a Gamut Boundary Description (GBD) of a given source device and a target device is first prepared. After converting the color space of an input color signal, the gamut mapping process is performed on lightness and chroma without changing hue.

In detail, a DDCS (Device Dependent Color Space) color space such as RGB and CMYK of the input color signal is converted to a DICS (Device Independent Color Space) such as CIE-XYZ and CIE-Lab, and the DDCS is converted again to the coordinates LCH (Lightness, Chroma, Hue). Then, on a plane with uniform color, namely, an LC plane, the gamut mapping process is performed on the lightness and chroma. One thing necessary before performing the gamut mapping is to learn the DICS or the color gamut of a device in LCH.

If the color gamut of a source device is broader than the color gamut of a target device, an original image of the source device should be mapped into the color gamut of the target device by using the prepared GBD. In other words, the original image of the source device being outside of the target device should be mapped into the color gamut of the target device, so that the target device can reproduce colors.

However, during the gamut compression process for compressing the colors of the original image of the source device within the color gamut of the target device, the colors of the original image are sometimes compressed too excessively. This occurs because the same method is applied to every color. In addition, although the related art gamut mapping technique is more focused on matching colors in the target device to the original image of the source device, users tend to make much of their color preference more than the accuracy of color matching. Therefore, an adaptive gamut compression process needs to be performed in consideration of the color gamut of the source device and the configuration and size of the color gamut of the target device.

Moreover, in order to increase the user's preference for particular original images of the source device, it is necessary to extend the compressed colors of the image. Especially, gamut extension should be done to increase appropriate chroma, under the restriction that a user's memory colors such as the color of skin, the color of the sky, and the color of field are not affected. Also, chroma extension is needed to provide high quality images after performing the gamut compression process on high chroma images.

SUMMARY OF THE INVENTION

An aspect of the present invention is to provide a gamut mapping apparatus and method thereof, in which, when the color gamut of a target device is narrower than the color gamut of a source device, gamut compression and gamut mapping are performed adaptively to the configuration of the gamut, and chroma of colors being relatively more compressed due to great differences in the gamut area is extended to provide an optimum picture quality.

According to an aspect of the invention, there is provided a gamut mapping apparatus, including: a gamut analyzing unit for analyzing the gamut of a source device and the gamut of a target device by using a gamut information profile; a gamut compressing unit for mapping original images of the source device within the gamut of the target device by using the analytical information on the gamuts; and a gamut extending unit for increasing the chroma of predetermined images among the compressed original images on the basis of the analytical information on the gamuts and the performance result of the gamut compressing unit.

Here, the information on the gamuts includes at least one of maximum and minimum lightness values within the gamut of the source device, maximum and minimum lightness values of within the gamut of the target device, cusp of the maximum chroma within the gamut of the source device, cusp of the maximum chroma within the gamut of the target device, distance between the cusp in the gamut of the source device and the cusp in the gamut of the target device, area difference between the gamut of the source device and the gamut of the target device, and difference in lightness reproduction range between the source device and the target device.

In an exemplary embodiment, the gamut compressing unit determines a gamut compression threshold, in which the gamut compressing threshold is a lower compression limit for the colors of the original images of the source device to fit within the gamut of the target device, based on the area difference between the gamut of the source device and the gamut of the target device.

Further, the gamut compressing unit may determine the gamut compression threshold based on the area difference between the gamuts, so as to prevent deteriorations in picture quality due to the original images being clipped on the gamut boundary of the target device during the gamut compression process.

In another exemplary embodiment, the gamut compression threshold is determined as follows:

$$P=0.75T_b, A>15$$

$$P=(-0.0167A+1)T_b, A \leq 15$$

wherein, P indicates the gamut compression threshold, A indicates the area difference between the gamuts, and Tb indicates the gamut boundary of the target device.

If the colors of the original images fall within the gamut compression threshold, the gamut compressing unit does not compress colors of the original images; whereas if the colors of the original images are outside of the gamut compression threshold, the gamut compressing unit maps, based on the distance between the gamut of the source device and the gamut of the target device, the colors of the original images to fit between the gamut of the target device and the gamut compression threshold.

Further, if the area difference between the gamuts is greater than a predetermined value, the gamut compressing unit may compress the colors of the original image being outside of the gamut of the target device based on the distance between the gamut of the source device and the gamut of the target device; whereas if the area difference between the gamuts is smaller than the predetermined value, the gamut compressing unit compresses the colors of the original images being outside of the gamut of the target device to fall on the gamut boundary of the target device.

In an exemplary embodiment, if the colors of the original images are outside of the gamut of the target device, the gamut compression is performed according to the following Equation:

$$d_m = d_0, \; d_0 < p_c d_t$$

$$d_m = p_c d_t + \frac{(d_0 - (1 - P_c d_t))*(1 - P_c)d_t}{d_s - p_c d_t}, \; d_0 > p_c d_t$$

wherein, $d_m$ indicates the distance between the image having a compressed gamut and the lightness value of the cusp in the gamut of the target device; $d_o$ indicates the distance between the original image and the intersection of the cusp in the gamut of the target device and the lightness axis; $d_s$, being in the same line with the $d_o$, indicates the distance between the gamut of the source device and the lightness value of the cusp in the gamut of the target device; $d_t$, being in the same line with the $d_o$, indicates the distance between the gamut of the target device and the lightness value of the cusp in the gamut of the target device; and $P_c$ indicates the chroma value at the intersection between the gamut compression threshold and the straight line $d_o$.

Also, the gamut expending unit may extend the compressed colors of the original images by applying an extension rate determined by a function where the gamut extension rate increases proportionally to the area difference between the gamut of the source device and the gamut of the target device among the information on the gamuts.

Preferably, the gamut extending unit determines a chroma value at the gamut extension start point according to the colors of the original images.

In another exemplary embodiment, the gamut extending unit performs the gamut extension process based on the following equation:

$$C_{out} = C_s + \frac{S_i - \min(S)}{\max(S) - \min(S)}(C_{max} - C_s)$$

wherein, $C_{out}$ indicates the chroma of an original image to which the gamut extension is applied; $C_s$ indicates the chroma at the extension start point; $C_{max}$ indicates a maximum chroma value among the images having the chroma at the extension start point and the same lightness; $S_i$ indicates the probability for use in the image under the gamut extension; and min(S) and max(S) indicate, respectively, a minimum value and a maximum value out of the probability densities of an image under the gamut extension.

Another aspect of the present invention provides a gamut mapping method, including: analyzing the gamut of a source device and the gamut of a target device by using a gamut information profile; if the gamut of the source device is broader than the gamut of the target device, mapping original images of the source device within the gamut of the target device by using the analytical information on the gamuts; and on the basis of the analytical information on the gamuts and the performance result of the gamut compressing unit, increasing the chroma of predetermined images among the compressed original images.

In another exemplary embodiment of the invention, the information on the gamuts comprises one of maximum and minimum lightness values within the gamut of the source device, maximum and minimum lightness values of within the gamut of the target device, cusp of the maximum chroma within the gamut of the source device, cusp of the maximum chroma within the gamut of the target device, distance between the cusp in the gamut of the source device and the cusp in the gamut of the target device, area difference between the gamut of the source device and the gamut of the target device, and difference in lightness reproduction range between the source device and the target device.

In an exemplary method, a gamut compression threshold, which is a lower compression limit for the colors of the original images of the source device to fit within the gamut of the target device, is determined based on the area difference between the gamut of the source device and the gamut of the target device.

Further, the gamut compression threshold may be determined based on the area difference between the gamuts, so as to prevent deteriorations in picture quality due to the original images being clipped on the gamut boundary of the target device during the gamut compression process.

In another exemplary embodiment of the invention, the gamut compression threshold is determined as follows:

$$P=0.75T_b, A>15$$

$$P=(-0.0167A+1)T_b, A \leq 15$$

wherein, P indicates the gamut compression threshold; A indicates the area difference between the gamuts; and $T_b$ indicates the gamut boundary of the target device.

If the colors of the original images fall within the gamut compression threshold, colors of the original images are not compressed; whereas if the colors of the original images are outside of the gamut compression threshold, the colors of the original image are mapped and get compressed to fit between the gamut of the target device and the gamut compression threshold, based on the distance between the gamut of the source device and the gamut of the target device.

If the area difference between the gamuts is greater than a predetermined value, the colors of the original image being outside of the gamut of the target device get compressed based on the distance between the gamut of the source device and the gamut of the target device; whereas if the area difference between the gamuts is smaller than the predetermined value, the colors of the original images being outside of the gamut of the target device get compressed to fall on the gamut boundary of the target device.

In another exemplary embodiment of the invention, if the colors of the original images are outside of the gamut of the target device, the gamut compression is performed according to the following Equation:

$$d_m = d_0, \, d_0 < p_c d_t$$

$$d_m = p_c d_t + \frac{(d_0 - (1 - P_c d_t)) * (1 - P_c) d_t}{d_s - p_c d_t}, \, d_0 > p_c d_t$$

wherein, $d_m$ indicates the distance between the image having a compressed gamut and the lightness value of the cusp in the gamut of the target device; $d_o$ indicates the distance between the original image and the intersection of the cusp in the gamut of the target device and the lightness axis; $d_s$, being in the same line with the $d_o$, indicates the distance between the gamut of the source device and the lightness value of the cusp in the gamut of the target device; $d_t$, being in the same line with the $d_o$, indicates the distance between the gamut of the target device and the lightness value of the cusp in the gamut of the target device; and $P_c$ indicates the chroma value at the intersection between the gamut compression threshold and the straight line do.

The compressed colors of the original images are extended by applying an extension rate determined by a function where the gamut extension rate increases proportionally to the area difference between the gamut of the source device and the gamut of the target device among the information on the gamuts.

The gamut extension is performed by using a chroma value at the gamut extension start point that is determined according to the colors of the original images.

In another exemplary embodiment of the invention, the gamut extension process is performed based on the following equation:

$$C_{out} = C_s + \frac{S_i - \min(S)}{\max(S) - \min(S)} (C_{max} - C_s)$$

wherein, $C_{out}$ indicates the chroma of an original image to which the gamut extension is applied; $C_s$ indicates the chroma at the extension start point; $C_{max}$ indicates a maximum chroma value among the images having the chroma at the extension start point and the same lightness; $S_i$ indicates the probability for use in the image under the gamut extension; and $\min(S)$ and $\max(S)$ indicate, respectively, a minimum value and a maximum value out of the probability densities of an image under the gamut extension.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

An exemplary embodiment of the present invention will be described herein below with reference to the accompanying drawings.

Figure 1:
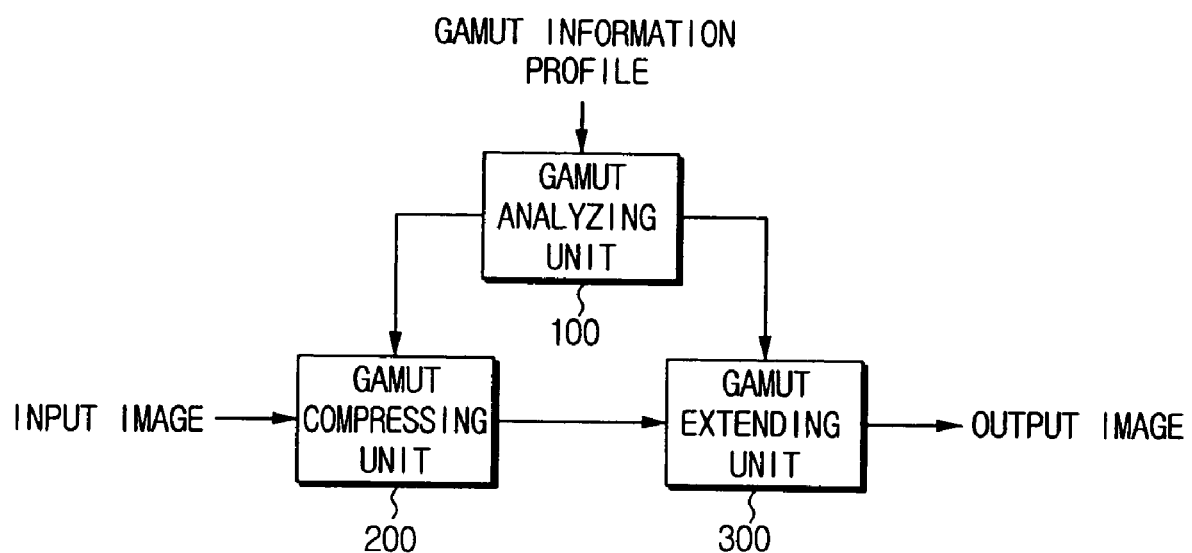
FIG. 1 is a schematic block diagram of a gamut mapping apparatus according to an exemplary embodiment of the present invention.

FIG. 1 is a schematic block diagram of a gamut mapping apparatus according to an exemplary embodiment of the present invention.

Referring to FIG. 1, the gamut mapping apparatus includes a gamut analyzing unit 100, a gamut compressing unit 200, and a gamut extending unit 300.

The gamut analyzing unit 100 obtains information on the color gamuts of a source device and a target device using a pre-stored gamut information profile. The information on the color gamuts of the source and target devices may include, but is not limited to maximum and minimum lightness values within the gamut of the source device, maximum and minimum lightness values of within the gamut of the target device, cusp of the maximum chroma within the gamut of the source device, cusp of the maximum chroma within the gamut of the target device, distance between the cusp in the gamut of the source device and the cusp in the gamut of the target device, area difference between the gamut of the source device and the gamut of the target device, and difference in lightness reproduction range between the source device and the target device.

This information on the color gamuts of the source device and the target device are used by the gamut compressing unit 200 and the gamut extending unit 300 for gamut compressing and gamut extension, respectively.

The gamut compressing unit 200 performs an adaptive gamut compression process to the configuration of a gamut, based on the information on the color gamuts of the source device and the target device provided by the gamut analyzing unit 100. Here, gamut compression is the process of mapping colors that do not exist within the color gamut of a target device among original images of a source device into the color gamut of the target device, especially in a case where the color gamut of the target device is larger than the color gamut of the source device during the color reproduction process between apparatuses.

Also, based on the area difference in the gamut of the source device and the gamut of the target device, the gamut compressing unit 200 determines a gamut compression threshold value, and performs color compression on lightness and chroma of an original image of the source device in reference to the gamut compression threshold. Meanwhile, the gamut compression process is not performed on images having the colors within the gamut compression threshold range. As for images having colors outside of the gamut compression threshold range, however, the gamut compressing unit 200 compresses the colors of these images within the gamut compression threshold and the gamut range of the target device on the basis of the distance between the gamut of the source device and the gamut of the target device. Here, an original image of the source device being expressed in device independent color coordinates is converted to L*C*H, and the image colors are compressed within the gamut of the target device.

For the optimum gamut compression, the gamut compression is first performed on the lightness of the original image of the source device, and then on the chroma thereof. When the gamut compression is performed only on the lightness of the original image of the source device, the gamut compressing unit 200 performs the gamut compression process by using the maximum and minimum lightness values within the color gamut of the source device and the maximum and minimum lightness values within the color gamut of the target device provided by the gamut analyzing unit 100.

The gamut extending unit 300 performs the gamut extension process by using the area difference between the gamut of the source device and the gamut of the target device provided by the gamut analyzing unit 100. If the area difference between the gamuts is large, it means that relatively many colors are compressed so that a higher extension rate is applied for gamut extension. On the other hand, if the area difference between the gamuts is small, it means that a relatively small number of colors are compressed so that a lower extension rate is applied for gamut extension. At this time, the gamut extending unit 300 determines the gamut extension start point by colors. The gamut extension extends chroma to increase a user's preference on memory colors he recognizes and remembers, and compensates an excessively compressed image at the gamut compressing unit 200.

Figure 2:
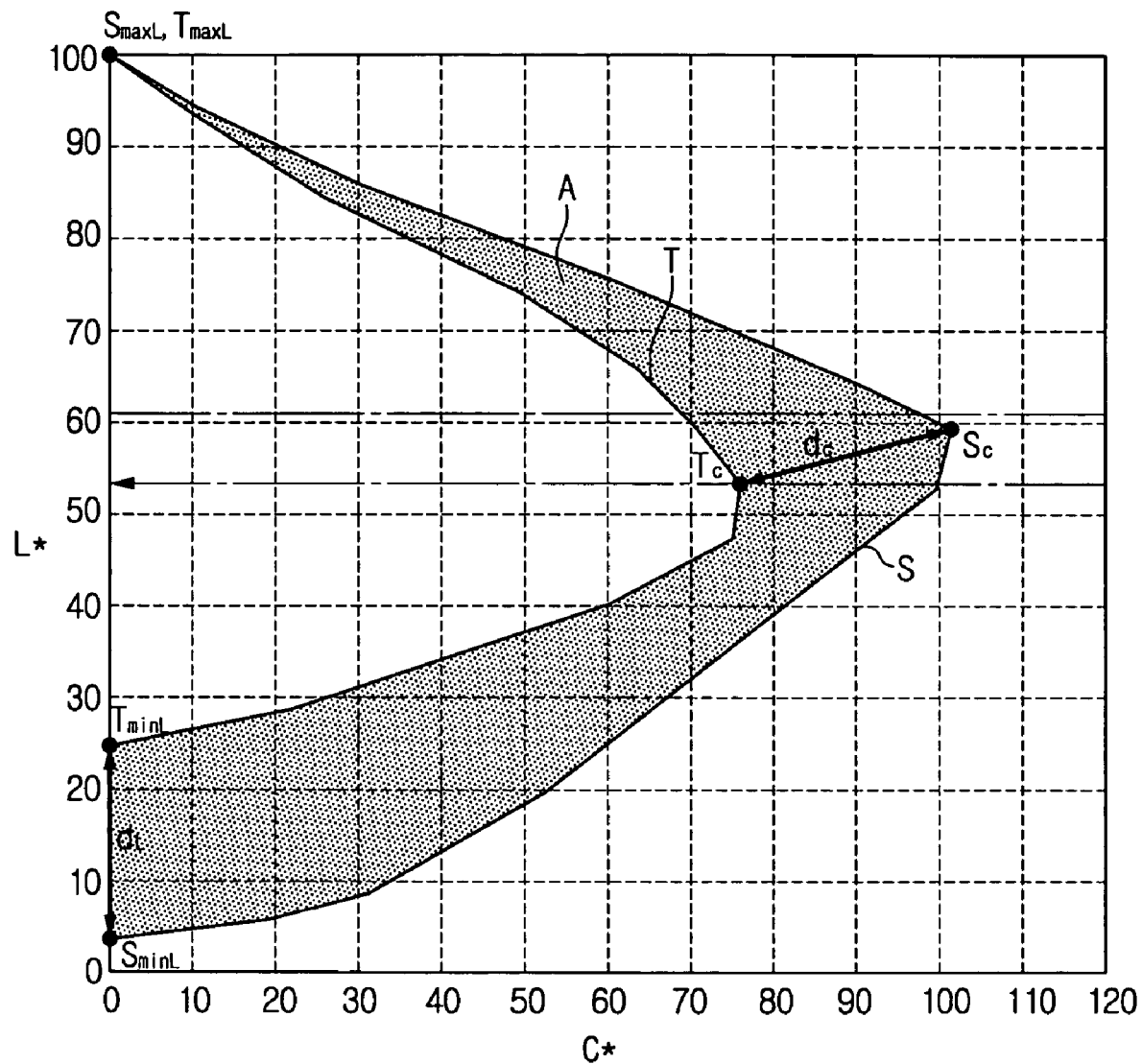
FIG. 2 is a diagram for explaining the operation of a gamut analyzing unit of FIG. 1.

FIG. 2 is a graph for explaining the operation of the gamut analyzing unit 100 of FIG. 1. In the graph of FIG. 2, the x-axis indicates chroma and the y-axis indicates lightness. Further, 'S' denotes the gamut of the source device, and 'T' denotes the gamut of the target device.

Referring to FIG. 2, the gamut analyzing unit 100 obtains information on the gamuts of the source device and the target device by using a pre-stored gamut information profile. Here, the information on the gamuts of the source device and the target device corresponds to the information on lightness and chroma by colors within the gamut of the source device and within the gamut of the target device, respectively.

In FIG. 2, $S_c$ indicates the cusp in the gamut S of the source device; $T_c$ indicates the cusp in the gamut T of the target device; $S_{maxL}$ and $S_{minL}$ indicate maximum and minimum lightness values of the gamut S of the source device, respectively; $T_{maxL}$ and $T_{minL}$ indicate maximum and minimum lightness values of the gamut T of the target device, respectively; and A indicates the area difference between the gamut S of the source device and the gamut T of the target device.

In addition, $d_c$ indicates the distance between the cusp $S_c$ in the gamut of the source device and the cusp $T_c$ in the gamut of the target device, i.e., the distance between $S_c$ and $T_c$; $d_L$ indicates the difference in lightness reproduction between the gamuts, that is, the distance between the difference in the maximum and minimum lightness values $S_{maxL}$, $S_{minL}$ within the gamut of the source device and the difference in the maximum and minimum lightness values $T_{maxL}$, $T_{minL}$ within the gamut of the target device, $d_L = (S_{maxL} - S_{minL}) - (T_{maxL} - T_{minL})$.

Therefore, as shown in FIG. 2, the gamut analyzing unit 100 analyzes the maximum and minimum lightness values within the gamut of the source device and the target device, respectively, the cusp of maximum chroma in the gamut of each device, the distance between the cusp in the gamut of the source device and the cusp in the gamut of the target device, the area difference between the gamut of the source device and the gamut of the target device, and the difference in lightness reproduction range between the source device and the target device.

Figure 3A:
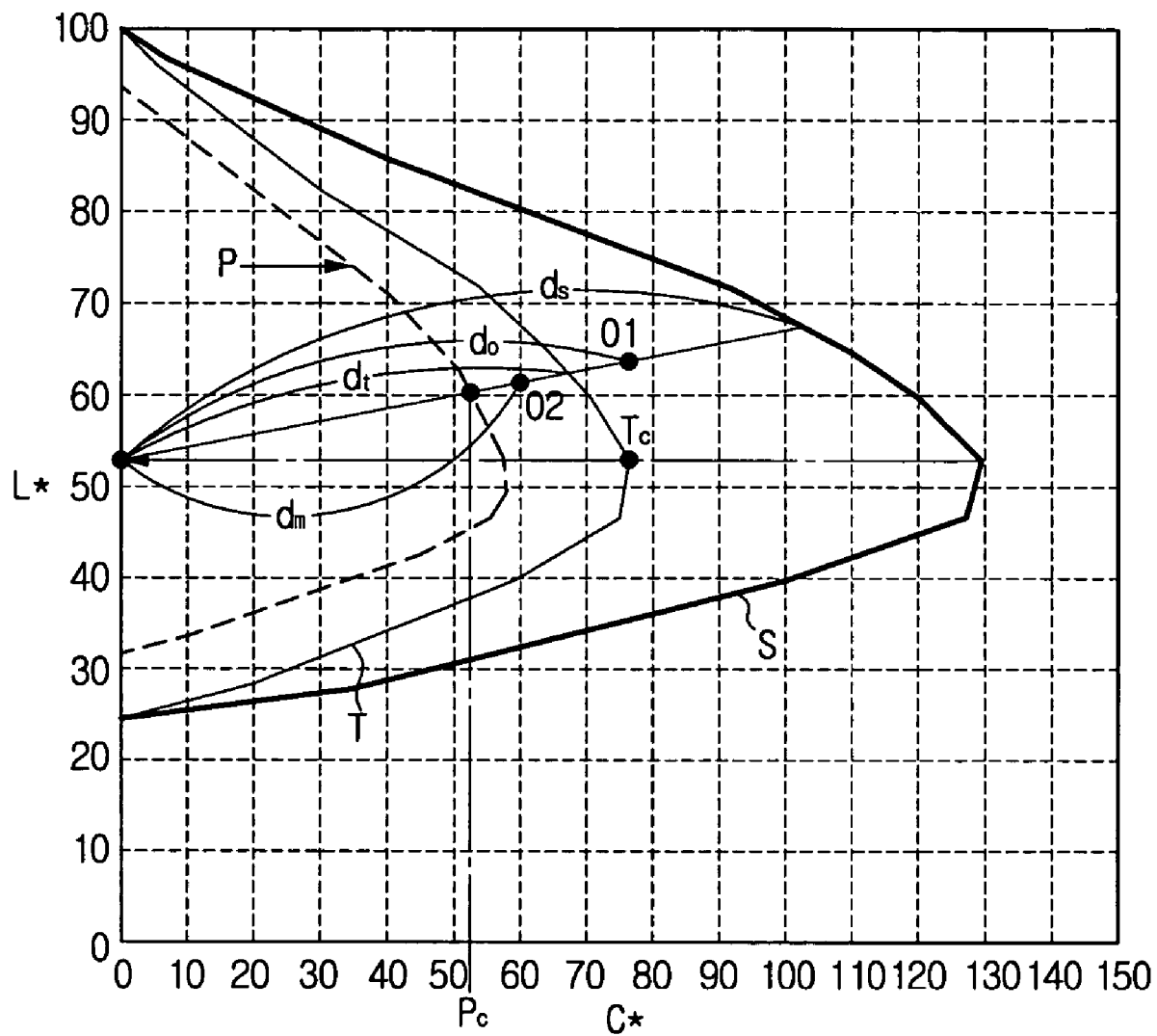
FIG. 3A and FIG. 3B are diagrams for explaining the operation of a gamut compressing unit of FIG. 1.
Figure 3B:
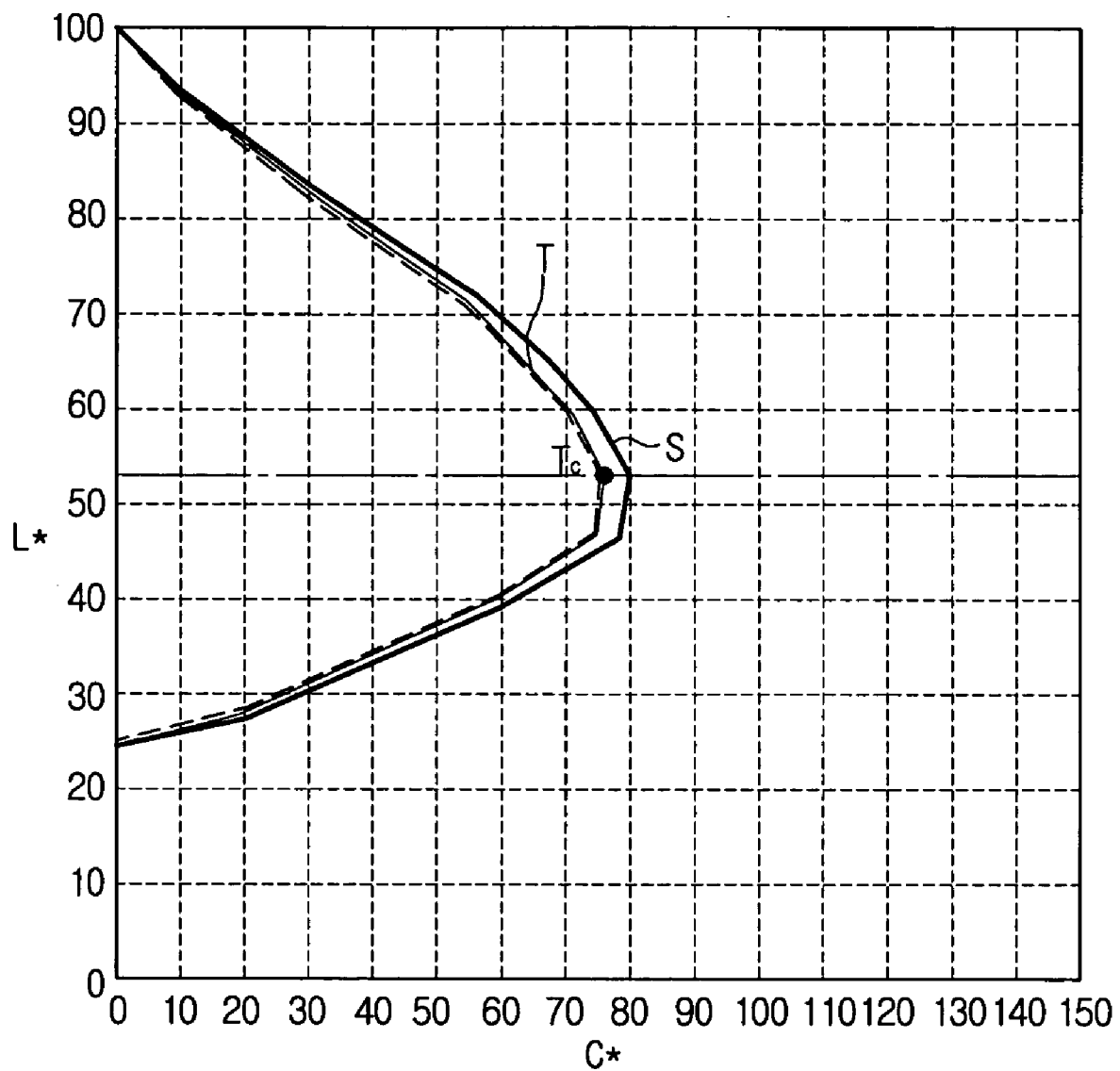

FIGS. 3A and 3B are graphs for explaining the operation of the gamut compressing unit 200 of FIG. 1. In detail, FIG. 3A indicates a case where the area difference A between the gamut of the source device and the gamut of the target device is large, whereas FIG. 3B indicates a case where the area difference A between the gamut of the source device and the gamut of the target device is small.

In the graphs of FIGS. 3A and 3B, the x-axis indicates chroma and the y-axis indicates lightness. In the graphs, 'S' indicates the color gamut of the source device; 'T' indicates the color gamut of the target device; 'P' indicates a gamut compression threshold determined based on the area difference A between the gamuts provided by the gamut analyzing unit 100; '01' indicates an original image of the source device; '02' indicates an image having compressed colors within the gamut; $T_c$ indicates the cusp in the gamut of the target device; and $T_{cL}$ is an intersection between the cusp $T_c$ in the gamut of the target device and the lightness axis, indicating a brightness value of the cusp in the gamut of the target device.

For more accurate gamut compression, the gamut compression process is performed first on the lightness and then on the chroma. The gamut compression for the lightness is performed using the soft-knee function. The lightness of an original image color being compressed through the 75% soft-knee function is obtained by Equation 1 below.

$$T_L = S_L, \quad k \le S_L < S_{\max L} \qquad \text{[Equation 1]}$$
$$\alpha \frac{(k - T_{\max L})}{(k - S_{\max L})}(S_L - S_{\min L})) + T_{\max L}, \quad S_{\min L} \le S_L < k$$

where, $T_L$ indicates the lightness of an original image with only the brightness being compressed; $S_L$ indicates an original image of the source device located in the outside of the gamut of the target device; $S_{minL}$ and $S_{maxL}$ indicate minimum and maximum lightness values of the source device, respectively; $T_{minL}$ and $T_{maxL}$ indicate minimum and maximum lightness values of the target device, respectively; k indicates a smoothing coefficient; and α indicates a smoothing coefficient for the brightness of an output image with respect to an input image, given that the brightness of the input image is lower than a predetermined brightness.

Referring to FIG. 3A, to prevent an excessive gamut compression of the original image caused by the large area difference between the gamuts of the source device and the target device, the colors of the original images should not compressed more than the gamut compression threshold. The gamut compression threshold is determined using the area difference between the gamuts as shown in Equation 2 below.

$$P = 0.75 T_b, A > 15$$
$$P = (-0.0167A + 1)T_b, A \leq 15 \qquad \text{[Equation 2]}$$

wherein, P indicates the gamut compression threshold; A indicates the area difference between the gamuts; and $T_b$ indicates the gamut boundary of the target device. As can be seen in Equation 2, each gamut compression threshold is obtained on the basis of the area difference (i.e., 15) between the gamuts.

If the colors of the original image 01 falls within the gamut compression threshold P, it means that the original image 01 can be reproduced by the target device, so the gamut compression is not required. On the other hand, if the colors of the original image 01 do not exist within the gamut compression threshold P, it means that the original image 01 cannot be reproduced by the target device, so the gamut compression should be performed in order to fit the colors of the original images between the gamut compression threshold and the gamut of the target device.

When the gamut compression rate is high due to the large area difference between the gamuts, every original image of the source device being located outside of the gamut of the target device is mapped onto the gamut boundary of the target device, thereby causing clipping. Therefore, the gamut compression prevents this clipping phenomenon by compressing the colors of the original images of the source device to fit within the gamut compression threshold P. Meanwhile, if the original images of the source device being located outside of the gamut of the target device are all mapped onto the gamut boundary of the target device, the reproduction of those images are often performed inaccurately. Therefore, by compressing the colors of the images to the gamut compression threshold P, the color differences in the original images of the source device being located outside of the gamut of the target device can be expressed very accurately.

Referring next to FIG. 3B, when the area difference A between the gamuts of the source device and the target device is small, the original images of the source device located outside of the gamut of the target device are mapped onto the gamut boundary of the target device, irrespective of the gamut compression threshold P. This is because if the area difference A between the gamuts of the source device and the target device is small, the difference in tone between the original images of the source device being located outside of the gamut of the target device and the image on the gamut boundary of the target device is also small. Therefore, even though the original images of the source device being located outside of the gamut of the target device may be mapped onto the gamut boundary of the target device, the clipping phenomenon seldom occurs, and color distortions are not generated at all during the color reproduction of the original images.

Equation 3 below illustrates how to compress the gamut of an image.

$$d_m = d_0, \; d_0 < p_c d_t$$
$$d_m = p_c d_t + \frac{(d_0 - (1 - P_c d_t)) * (1 - P_c) d_t}{d_s - p_c d_t}, \; d_0 > p_c d_t \qquad \text{[Equation 3]}$$

wherein, $d_o$ indicates the distance between the original image 01 and the intersection $T_{cL}$ of the cusp in the gamut of the target device and the lightness axis; $d_m$ indicates the distance between the image 02 having a compressed gamut and the lightness value $T_{cL}$ of the cusp in the gamut of the target device; $d_s$, being in the same line with the $d_o$, indicates the distance between the gamut S of the source device and the lightness value $T_{cL}$ of the cusp in the gamut of the target device; $d_t$, being in the same line with the $d_o$, indicates the distance between the gamut T of the target device and the lightness value $T_{cL}$ of the cusp in the gamut of the target device; and $P_c$ indicates the chroma value at the intersection between the gamut compression threshold P and the straight line $d_o$.

In short, if the area difference between the gamuts is smaller than a predetermined value, the original images of the source device being located outside of the gamut compression threshold are mapped onto the gamut boundary of the target device, whereas if the area difference between the gamuts is greater than a predetermined value, the original images of the source device being located outside of the gamut compression threshold are mapped between the gamut compression threshold and the gamut of the target device.

Figure 4A:
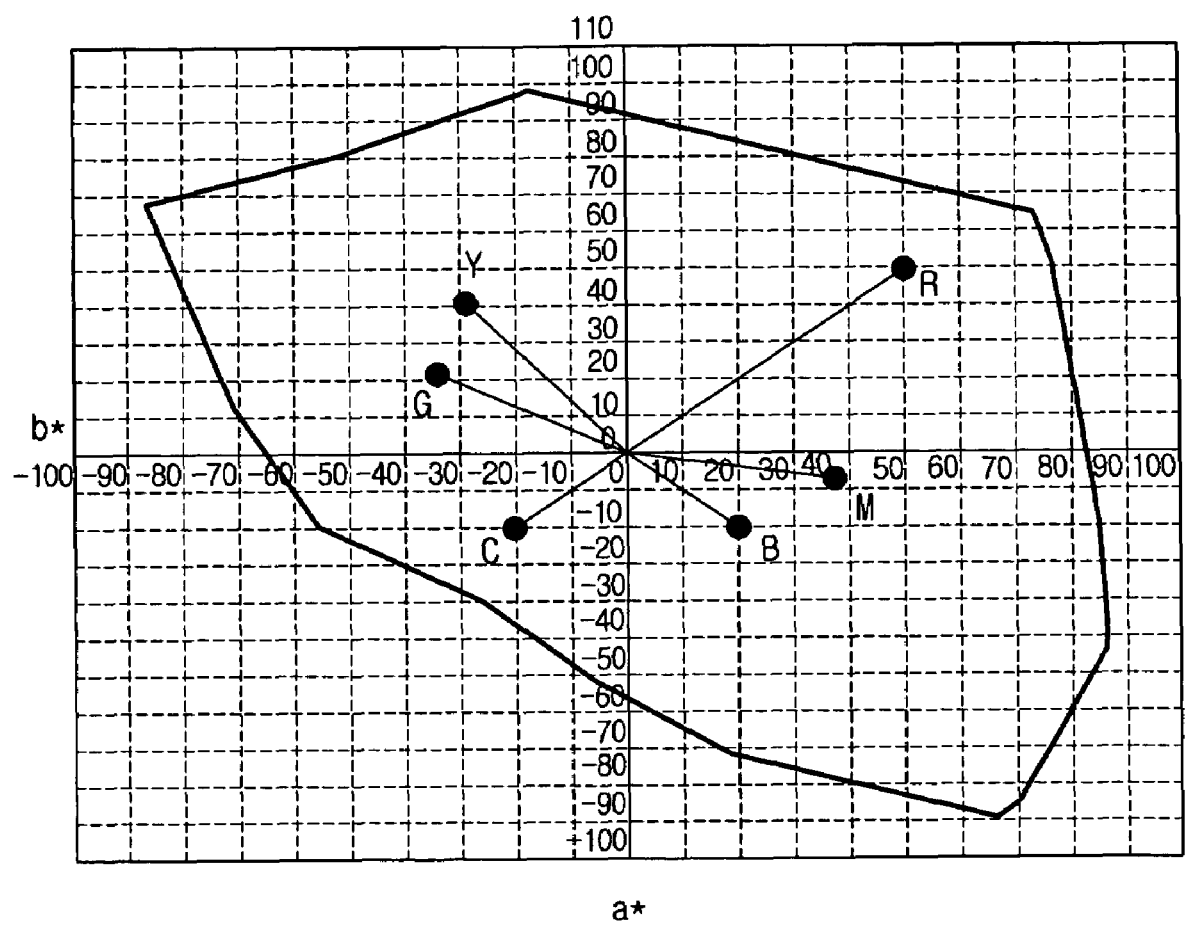
FIG. 4A and FIG. 4B are diagrams for explaining how to determine an extension start point of a gamut extending unit of FIG. 1.
Figures 4B, 5:
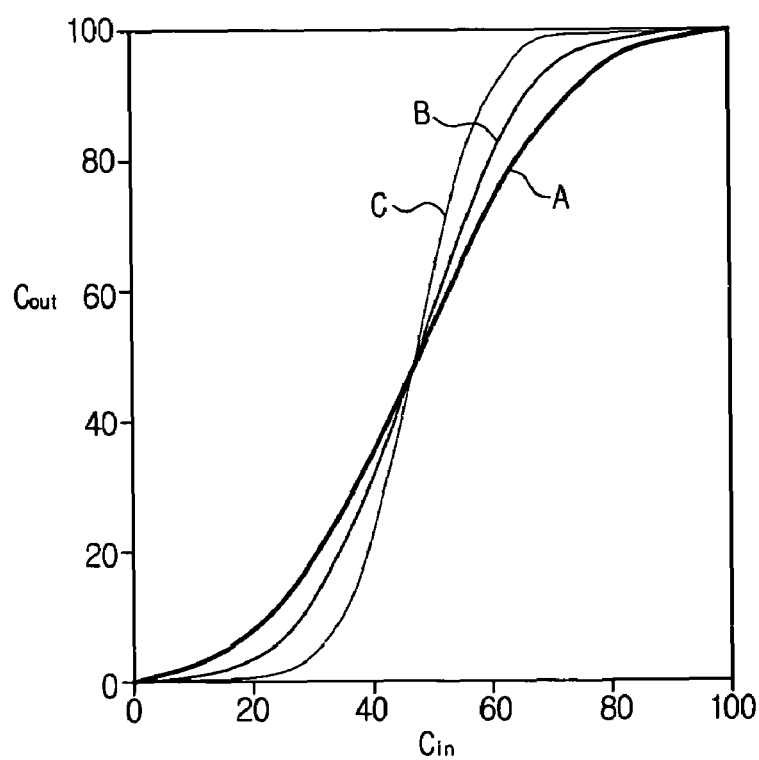
FIG. 5 is a diagram for explaining how a gamut extending unit of FIG. 1 determines an extension rate of a gamut extending unit of FIG. 1.

FIGS. 4A and 4B are diagrams for explaining how the gamut extending unit 300 determines an extension start point.

As shown in FIGS. 4A and 4B, the extension start point to which the chroma extension rate calculated by the gamut extending unit 300 is applied differs by colors. For instance, the extension start point of red (R) is 50.0, yellow (Y) 40.0, green (G) 40.0, cyan (C) 20.0, blue (B) 15.0 and magenta (M) 35.0, respectively.

These six colors, i.e., red, yellow, green, cyan, blue, and magenta, can be obtained using the characteristics of the target device, and the other colors can be obtained through linear interpolation using the extension start points of those six colors. At this time, the extension start points can also be set differently. For instance, a low extension start point is applied to blue-cyan that are sensitive to the human eyes so that a high chroma extension rate can be applied thereto. Here, the extension start point is carefully determined not to incur any distortion in the user's memory colors.

FIG. 5 is a diagram graphically explaining how the gamut extending unit 300 of FIG. 1 determines the extension rate. In the graph of FIG. 5, the x-axis indicates an input chroma, i.e., chroma values higher than the chroma extension start point, and the y-axis indicates an output chroma to which the gamut extension is applied.

Referring to FIG. 5, the gamut extending unit 300 determines the extension rate by using the area difference A between the gamuts of the source device and the target device. For example, if the area difference A between the gamuts is large, a high gamut extension rate is applied, whereas if the area difference A between the gamuts is small, a low gamut extension rate is applied. In other words, gamut extension rates can be determined by a function where the extension rate increases proportionally to the area difference between the gamuts. Equation 4 shows a formula for obtaining a probability for use in an image under gamut extension.

$$S_i = \sum_{n=0}^{n=i} \frac{1}{\sqrt{2\pi\sigma}} e^{-\frac{\left(\frac{n}{m} - x_0\right)^2}{2\sigma^2}} \qquad \text{[Equation 4]}$$

where, $S_i$ a probability for use in an image under gamut extension; 'i' is a normalized value from the chroma extension start point of each color under gamut extension to the maximum chroma within the gamut of the target device; 'm' indicates a normalized value of the chroma at the extension start point; 'n' is a random number; $x_0$ indicates the mean in a normalized distribution; and σ indicates the standard deviation in a normalized distribution. As mentioned earlier, the chroma extension start point is determined differently depending on the color.

Meanwhile, the relation between the standard deviation in the normalized distribution of probability densities of an image to which the gamut extension rate is applied and the chroma to which the gamut extension is applied is reflected on each curve in FIG. 5. More specifically, curve A is obtained when the standard deviation equals to 20, curve B is obtained when the standard deviation equals to 15, and curve C is obtained when the standard deviation equals to 10, respectively.

Therefore, using the probability of the image being extended and the chroma of the extended image, that is, the chroma at the extension start point, the chroma of an image can be obtained as follows;

$$C_{out} = C_s + \frac{S_i - \min(S)}{\max(S) - \min(S)}(C_{max} - C_s) \quad \text{[Equation 5]}$$

wherein, $C_{out}$ indicates the chroma of an original image to which the gamut extension is applied; $C_s$ indicates the chroma at the extension start point; $C_{max}$ indicates a maximum chroma value among the images having the chroma at the extension start point and the same lightness; $S_i$ indicates the probability for use in the image under the gamut extension; min(S) indicates a minimum value out of the probability densities of an image under the gamut extension; and max(S) indicates a maximum value out of the probability densities of an image under the gamut extension.

Figure 6:
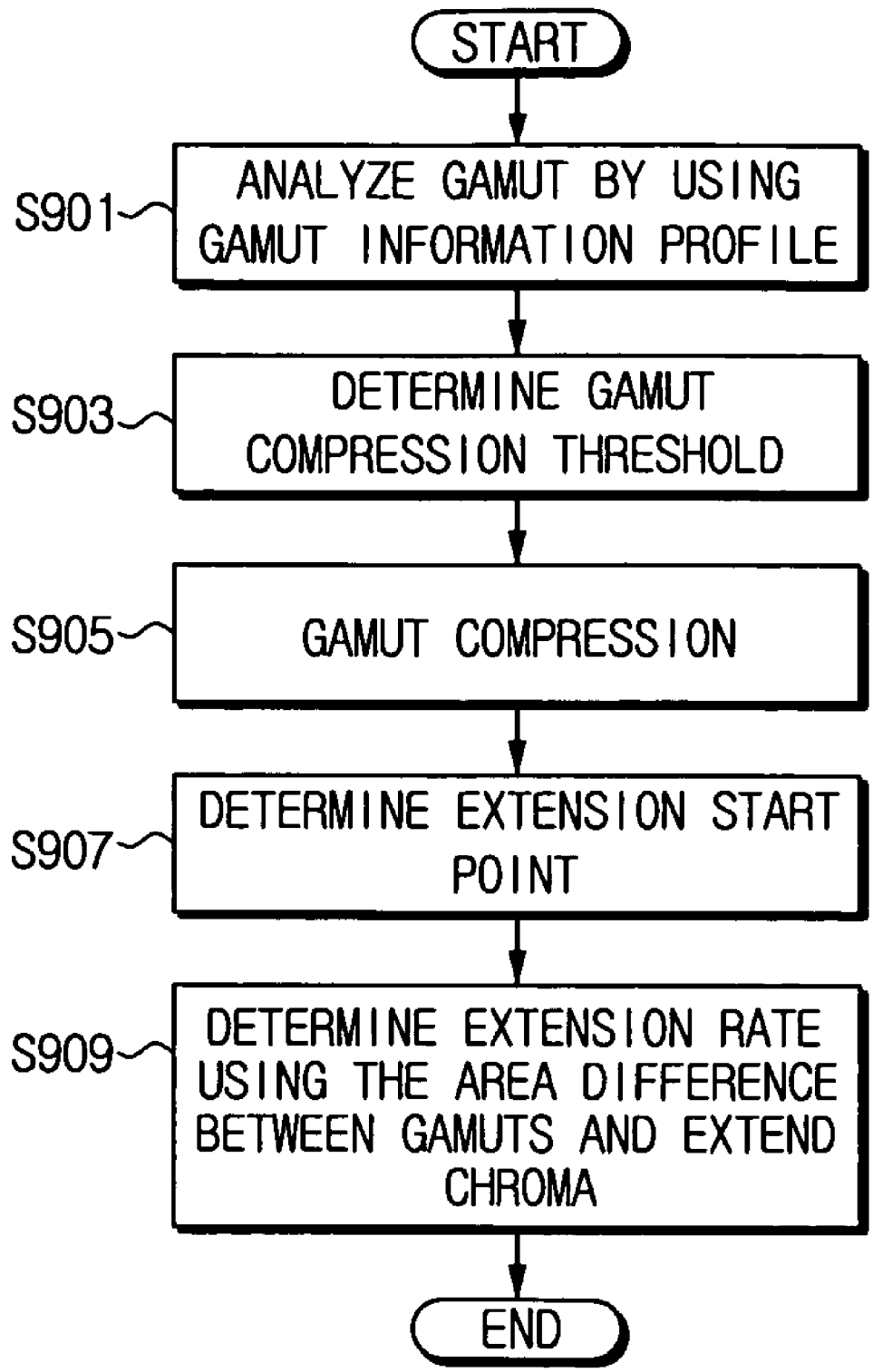
FIG. 6 is a flow chart describing a gamut mapping method according to an exemplary embodiment of the present invention.

FIG. 6 is a flow chart describing a gamut mapping method according to an exemplary embodiment of the present invention.

Referring to FIG. 6, at first, information on the gamut of the source device and the gamut of the target device are analyzed using the pre-stored gamut information profile (S901). Here, the information on the color gamuts of the source and target devices include maximum and minimum lightness values within the gamut of the source device, maximum and minimum lightness values within the gamut of the target device, cusp of the maximum chroma within the gamut of the source device, cusp of the maximum chroma within the gamut of the target device, distance between the cusp in the gamut of the source device and the cusp in the gamut of the target device, area difference between the gamut of the source device and the gamut of the target device, and the difference in lightness reproduction range between the source device and the target device.

Next, a gamut compression threshold which is the boundary for the gamut compression is determined based on the analytical information about the gamut (S903). In detail, if the gamut of the source device is broader than the gamut of the target device, an original image of the source device located outside of the gamut of the target device needs to be mapped within the gamut of the target device, i.e., onto the gamut boundary of the target device. Here, the gamut boundary of the target device corresponds to the gamut compression threshold.

When the area difference between the gamut of the source device and the gamut of the target device is considerably large, every original image of the source device being located outside of the gamut of the target device is mapped onto the gamut boundary of the target device. Since a plurality of original images are overlapped (or clipped) on the gamut boundary of the target device, the target device cannot reproduce the original images more accurately. This is why the gamut compression threshold within the gamut of the target device is determined based on the area difference between the gamuts, and the gamut of the source device is mapped within the gamut of the target device.

However, if the area difference between the gamut of the source device and the gamut of the target device is small, it means that only a small number of original images of the source device are mapped onto the gamut boundary of the target device. As such, the possibility of color distortions is very slim. Therefore, the original images of the source device being located outside of the gamut of the target device can be mapped onto the gamut boundary of the target device, irrespective of the gamut compression threshold.

At this time, the gamut compression threshold is obtained using the area difference between the gamut of the source device and the gamut of the target device. For instance, in a case where the area difference between the gamut of the source device and the gamut of the target device is large, the gamut compression threshold is determined in such a manner that the gamut compression rate is high. On the other hand, in a case where the area difference between the gamut of the source device and the gamut of the target device is small, the gamut compression threshold is determined in such a manner that the gamut compression rate is low. The formula for determining the gamut compression threshold is provided in Equation 2.

Next, the gamut compression process is performed by using the gamut compression threshold obtained (S905). If an original image of the source device is located within the gamut compression threshold, it means that the target device can reproduce the original image without performing the gamut compression process. However, if the original image of the source device is located outside of the gamut compression threshold (which varies according to the area difference between the gamut of the source device and the gamut of the target device), the colors of the original images get compressed to fit between the gamut compression threshold and the gamut boundary of the target device.

In detail, when the area difference between the gamuts is smaller than a predetermined value, the original images of the source device being located outside of the gamut of the target device are mapped onto the gamut boundary of the target device. On the other hand, when the area difference between the gamuts is greater than a predetermined value, the gamut compression process is performed using the gamut compression threshold. In this manner, the original images being located outside of the gamut of the target device are not overlapped (or clipped) but mapped differentially. Especially, if the area difference between the gamuts is small, the gamut compression rate is set to a small value, so that the target device can reproduce the original tones of the images being located outside of the gamut of the target device.

Instead of simultaneously performing the gamut compression on the chroma and the lightness of the original images, the gamut compression is first performed on the lightness only for more accurate gamut mapping. The gamut mapping on the lightness has already been explained with reference to Equation 1.

Later, the chroma extension start point of a compressed image color is determined by color areas (S907). Depending on the characteristics of the target device being used, extension start points for 6 colors consisting of red, yellow, green, cyan, blue and magenta are determined. The extension start points for other colors besides these six colors are determined by linear interpolation.

Lastly, a gamut extension rate may be determined by using the area difference between the gamuts of the source device and the target device (S909). When the area difference between the gamuts is relatively large, it means that many colors should be compressed by the gamut compressing unit 200. Thus, a high chroma extension rate is applied to the gamut extension process. Meanwhile, if the area difference between the gamuts is relatively small, a low chroma extension rate is applied to the gamut extension process. Therefore, the extension rate is determined by using a function where the extension rate increases proportionally to the area difference between the gamuts. The formulas for extension rates were explained with reference to Equations 4 and 5, and thusly determined extension rates were illustrated in FIGS. 3A and 3B.

Moreover, there are certain colors called the memory colors, such as the color of the sky, the color of skin, the color of field etc., which should not be distorted whatsoever. In this case, the user's preference must be increased by extending the chroma as shown in Equation 5, using the extension start point being determined. Also, if the gamut compression is performed too excessively due to the large area difference between the gamuts, a high chroma extension rate is applied to provide an optimum picture quality.

As explained so far, the present invention can be advantageously used for gamut mapping between devices with different gamuts from one another. Especially, if the gamut of the source device is broader than the gamut of the target device, the gamut compression process is performed before the gamut expansion process, taking the area difference between the gamuts of the devices into consideration. In this manner, the user is provided with the optimum quality images.

Furthermore, as for the images whose gamuts are excessively compressed with specific colors such as memory color, the chroma compression is performed after the gamut compression, so that it becomes possible to provide high quality images satisfying the user's preference. That is, by performing the gamut compression adaptively and relatively to the gamut of the target device and the gamut of the source device, and by performing the gamut compression and extension at the same time, it becomes possible to minimize distortions in the memory colors.

The foregoing exemplary embodiments and advantages are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A gamut mapping apparatus, comprising:
a gamut analyzing unit which analyzes a gamut of a source device and a gamut of a target device based on a gamut information profile to obtain analytical information on the gamuts;
a gamut compressing unit which compresses original images of the source device within the gamut of the target device using the analytical information; and
a gamut extending unit which increases a chroma of predetermined images among the compressed original images, based on at least one of the analytical information and a performance result of the gamut compressing unit.

2. The apparatus according to claim 1, wherein the analytical information on the gamuts comprises at least one of maximum and minimum lightness values within the gamut of the source device, maximum and minimum lightness values within the gamut of the target device, a cusp of a maximum chroma within the gamut of the source device, a cusp of a maximum chroma within the gamut of the target device, a distance between the cusp in the gamut of the source device and the cusp in the gamut of the target device, an area difference between the gamut of the source device and the gamut of the target device, and a difference in a lightness reproduction range between the source device and the target device.

3. The apparatus according to claim 1, wherein the gamut compressing unit determines a gamut compression threshold, which is a lower compression limit for colors of the original images of the source device to fit within the gamut of the target device, based on an area difference between the gamut of the source device and the gamut of the target device.

4. The apparatus according to claim 3, wherein the gamut compressing unit determines the gamut compression threshold based on the area difference between the gamuts, so as to prevent deteriorization in picture quality due to the original images being clipped on a gamut boundary of the target device during the gamut compression process.

5. The apparatus according to claim 3, wherein the gamut compression threshold is determined as follows:

$$P=0.75T_b, A>15$$

$$P=(-0.0167A+1)T_b, A\leq 15$$

wherein, P indicates the gamut compression threshold; A indicates the area difference between the gamuts; and $T_b$ indicates the gamut boundary of the target device.

6. The apparatus according to claim 3, wherein, if the colors of the original images fall within the gamut compression threshold, the gamut compressing unit does not compress colors of the original images, and if the colors of the original images are outside of the gamut compression threshold, the gamut compressing unit maps, based on a distance between the gamut of the source device and the gamut of the target device, the colors of the original images to fit between the gamut of the target device and the gamut compression threshold.

7. The apparatus according to claim 3, wherein, when the area difference between the gamuts is greater than a predetermined value, the gamut compressing unit compresses the colors of the original image being outside of the gamut of the target device based on the area distance between the gamut of the source device and the gamut of the target device, and when the area difference between the gamuts is smaller than the predetermined value, the gamut compressing unit compresses the colors of the original images being outside of the gamut of the target device to fall on a gamut boundary of the target device.

8. The apparatus according to claim 7, wherein, if the colors of the original images are outside of the gamut of the target device, the gamut compression is performed according to the following Equation:

$$d_m = d_0, d_0 < p_c d_t$$

-continued $$d_m = p_c d_t + \frac{(d_0 - (1 - P_c d_t))*(1 - P_c)d_t}{d_s - p_c d_t}, d_0 > p_c d_t$$

wherein, $d_m$ indicates a distance between the image having a compressed gamut and a lightness value of the cusp in the gamut of the target device; $d_o$ indicates a distance between the original image and an intersection of the cusp in the gamut of the target device and a lightness axis; $d_s$ is in a same line with the $d_o$ and indicates a distance between the gamut of the source device and the lightness value of the cusp in the gamut of the target device; $d_t$ is in a same line with the $d_o$ and indicates a distance between the gamut of the target device and the lightness value of the cusp in the gamut of the target device; and $P_c$ indicates a chroma value at an intersection between the gamut compression threshold and the straight line $d_o$.

9. The apparatus according to claim 1, wherein the gamut extending unit extends compressed colors of the original images by applying an extension rate determined by a function where a gamut extension rate increases proportionally to an area difference between the gamut of the source device and the gamut of the target device among the information on the gamuts.

10. The apparatus according to claim 1, wherein the gamut extending unit determines a chroma value at a gamut extension start point according to colors of the original images.

11. The apparatus according to claim 1, wherein the gamut extending unit performs the gamut extension process based on the following equation:

$$C_{out} = C_s + \frac{S_i - \min(S)}{\max(S) - \min(S)}(C_{max} - C_s)$$

wherein, $C_{out}$ indicates a chroma of an original image to which the gamut extension is applied; $C_s$ indicates a chroma at an extension start point; $C_{max}$ indicates a maximum chroma value among images having the chroma at the extension start point and a same lightness; $S_i$ indicates a probability for use in the image under the gamut extension; and $\min(S)$ and $\max(S)$ are a minimum value and a maximum value, respectively out of probability densities of an image under the gamut extension.

12. A gamut mapping method, comprising:
analyzing a gamut of a source device and a gamut of a target device by using a gamut information profile;
compressing original images of the source device within the gamut of the target device using the analytical information on the gamuts if the gamut of the source device is broader than the gamut of the target device; and
increasing a chroma of predetermined images among the compressed original images, based on at least one of the analytical information and a performance result of the gamut compressing unit.

13. The method according to claim 12, wherein the information on the gamuts comprises at least one of maximum and minimum lightness values within the gamut of the source device, maximum and minimum lightness values within the gamut of the target device, a cusp of a maximum chroma within the gamut of the source device, a cusp of a maximum chroma within the gamut of the target device, a distance between the cusp in the gamut of the source device and the cusp in the gamut of the target device, an area difference between the gamut of the source device and the gamut of the target device, and a difference in a lightness reproduction range between the source device and the target device.

14. The method according to claim 12, wherein a gamut compression threshold, which is a lower compression limit for the colors of the original images of the source device to fit within the gamut of the target device, is determined based on an area difference between the gamut of the source device and the gamut of the target device.

15. The method according to claim 14, wherein the gamut compression threshold is determined based on the area difference between the gamuts, so as to prevent deteriorization in picture quality due to the original images being clipped on the gamut boundary of the target device during the gamut compression process.

16. The method according to claim 14, wherein the gamut compression threshold is determined as follows:

$P=0.75T_b, A>15$ $P=(-0.0167A+1)T_b, A\leq15$ wherein P indicates the gamut compression threshold; A indicates the area difference between the gamuts; and $T_b$ indicates the gamut boundary of the target device.

17. The method according to claim 14, wherein, if the colors of the original images fall within the gamut compression threshold, colors of the original images are not compressed; and if the colors of the original images are outside of the gamut compression threshold, the colors of the original image are mapped and compressed to fit between the gamut of the target device and the gamut compression threshold, based on a distance between the gamut of the source device and the gamut of the target device.

18. The method according to claim 14, wherein, if the area difference between the gamuts is greater than a predetermined value, the colors of the original image being outside of the gamut of the target device get compressed based on the distance between the gamut of the source device and the gamut of the target device; whereas if the area difference between the gamuts is smaller than the predetermined value, the colors of the original images being outside of the gamut of the target device get compressed to fall on the gamut boundary of the target device.

19. The method according to claim 18, wherein when the colors of the original images are outside of the gamut of the target device, the gamut compression is performed according to the following Equation:

$$d_m = d_0, d_0 < p_c d_t$$

$$d_m = p_c d_t + \frac{(d_0 - (1 - P_c d_t))*(1 - P_c)d_t}{d_s - p_c d_t}, d_0 > p_c d_t$$

wherein, $d_m$ indicates a distance between the image having a compressed gamut and a lightness value of the cusp in the gamut of the target device; $d_o$ indicates a distance between the original image and an intersection of the cusp in the gamut of the target device and a lightness axis; $d_s$, being in a same line with the $d_o$, indicates a distance between the gamut of the source device and the lightness value of the cusp in the gamut of the target device; $d_t$, being in a same line with the $d_o$, indicates a distance between the gamut of the target device and the lightness value of the cusp in the gamut of the target device; and $P_c$ indicates a chroma value at an intersection between the gamut compression threshold and the straight line $d_o$.

20. The method according to claim 12, wherein compressed colors of the original images are extended by applying an extension rate determined by a function where a gamut extension rate increases proportionally to an area difference between the gamut of the source device and the gamut of the target device among the information on the gamuts.

21. The method according to claim 12, wherein the gamut extension is performed by using a chroma value at a gamut extension start point that is determined according to colors of the original images.

22. The method according to claim 12, wherein the gamut extending unit performs the gamut extension process based on the following equation:

$$C_{out} = C_s + \frac{S_i - \min(S)}{\max(S) - \min(S)}(C_{max} - C_s)$$

wherein, $C_{out}$ indicates a chroma of an original image to which the gamut extension is applied; $C_s$ indicates a chroma at an extension start point; $C_{max}$ indicates a maximum chroma value among the images having the chroma at the extension start point and a same lightness; $S_i$ indicates a probability for use in the image under the gamut extension; and min(S) and max(S) indicate, respectively, a minimum value and a maximum value out of probability densities of an image under the gamut extension.

* * * * *